United States Patent
Jainek (10) Patent No.: US 11,571,643 B2
(45) Date of Patent: Feb. 7, 2023

(54) FILTER ELEMENT OF A FILTER FOR LIQUID, FILTER AND FILTER HOUSING

(71) Applicant: MANN+HUMMEL GmbH, Ludwigsburg (DE)

(72) Inventor: Herbert Jainek, Heilbronn (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 145 days.

(21) Appl. No.: 16/887,445

(22) Filed: May 29, 2020

(65) Prior Publication Data

US 2020/0360841 A1 Nov. 19, 2020

Related U.S. Application Data

(63) Continuation of application No. PCT/EP2018/082836, filed on Nov. 28, 2018.

(30) Foreign Application Priority Data

Nov. 30, 2017 (DE) ...................... 10 2017 011 080.8

(51) Int. Cl.
*B01D 35/16* (2006.01)
*B01D 29/21* (2006.01)
(Continued)

(52) U.S. Cl.
CPC ............. *B01D 35/16* (2013.01); *B01D 29/21* (2013.01); *B01D 35/153* (2013.01); *B01D 35/30* (2013.01);
(Continued)

(58) Field of Classification Search
CPC ...... B01D 35/16; B01D 29/21; B01D 35/153; B01D 35/30; B01D 2201/342;
(Continued)

(56) References Cited

U.S. PATENT DOCUMENTS 5,556,542 A * 9/1996 Berman ................. B01D 29/96
  210/441
7,820,044 B2   10/2010 Nawa et al.
(Continued)

FOREIGN PATENT DOCUMENTS

DE   602006000380 T2    1/2009
KR      100775520 B1   12/2006
KR      100775520    * 11/2007

*Primary Examiner* — Madeline Gonzalez (57) ABSTRACT

An exchangeable filter element of a liquid filter has a filter medium surrounding circumferentially a virtual axis of the filter element. A discharge closure element is arranged eccentrically at an axial end face of the filter element. The discharge closure element closes off a discharge opening of a discharge channel of the filter housing when the filter element is installed in the filter housing. The discharge channel serves to empty liquid from the filter when the filter element is removed. The discharge closure element has a limited circumferential expansion with respect to the virtual axis. The discharge closure element has a closure surface arranged at an axial end face of the discharge closure element. The closure surface is at least partially axially oriented. The closure surface rests so as to seal axially at a sealing section of the filter housing that surrounds the discharge opening of the filter housing.

8 Claims, 3 Drawing Sheets (51) Int. Cl.
*B01D 35/30* (2006.01)
*B01D 35/153* (2006.01)
*F01M 11/03* (2006.01)

(52) U.S. Cl.
CPC ....... *F01M 11/03* (2013.01); *B01D 2201/342* (2013.01); *B01D 2201/40* (2013.01)

(58) Field of Classification Search
CPC .......... B01D 2201/40; B01D 2201/295; B01D 2201/4046; B01D 2201/4084; F01M 11/03
USPC ................ 210/407, 248, 450, 455, 441, 442
See application file for complete search history.

(56) References Cited

U.S. PATENT DOCUMENTS

| | | | |
|---|---|---|---|
| 2008/0169233 A1* | 7/2008 | Pfitzer | B01D 35/147 210/248 |
| 2012/0267293 A1 | 10/2012 | Ardes | |
| 2018/0065067 A1 | 3/2018 | Ardes | |
| 2019/0046903 A1 | 2/2019 | Bodén et al. | |

* cited by examiner

FILTER ELEMENT OF A FILTER FOR LIQUID, FILTER AND FILTER HOUSING

CROSS-REFERENCE TO RELATED APPLICATIONS

This application is a continuation application of international application No. PCT/EP2018/082836, having an international filing date of 28 Nov. 2018 and designating the United States, the international application claiming a priority date of 30 Nov. 2017 based on prior filed German patent application No. 10 2017 011 080.8, the entire contents of the aforesaid international application and the aforesaid German patent application being incorporated herein by reference.

BACKGROUND OF THE INVENTION

The invention concerns a filter element of a filter for liquid which is arranged or can be arranged exchangeably in a filter housing of the filter.

Moreover, the invention concerns a filter for liquid, with a filter housing in which at least one filter element is exchangeably arranged.

DE 20 2005 002 955 U1 discloses a filter insert for a liquid filter, in particular oil filter, with two end discs of which at least one has a central through passage and with a filter medium body arranged between the end discs. The liquid filter comprises a filter housing, provided with a cover, in which the filter insert is to be arranged as well as, in addition to an inlet channel for liquid to be purified and an outlet channel for purified liquid, a discharge channel for emptying the filter when exchanging the filter insert. As a closure member for the discharge channel, a closure pin is provided which extends axially outwardly from the end face of the filter insert facing the discharge channel, which is resting seal-tightly in a section of the discharge channel in the installed state of the filter insert and, upon pulling out the filter insert from the housing, can be pulled out therefrom with release of the discharge channel.

SUMMARY OF THE INVENTION

The invention concerns a filter element of a filter for liquid which is arranged or can be arranged exchangeably in a filter housing of the filter, with
  at least one filter medium which circumferentially surrounds a virtual axis,
  at least one discharge closure element which is eccentrically arranged at an end face, that is axial with respect to the axis, of the filter element and with which a discharge opening of a discharge channel of the filter housing, which serves for emptying the filter upon removal of the filter element, is closed in the installed state of the filter element, wherein the at least one discharge closure element is limited in its circumferential expansion circumferential with respect to the axis.

Moreover, the invention concerns a filter for liquid, with a filter housing in which at least one filter element is exchangeably arranged, wherein the filter housing has
  at least one inlet for liquid to be purified,
  at least one outlet for purified liquid,
  at least one discharge channel for liquid for emptying the filter upon removal of the at least one filter element,
  at least one closable installation opening for installing and removing the at least one filter element, wherein at least one filter element comprises
  at least one filter medium which circumferentially surrounds a virtual axis,
  at least one discharge closure element which is arranged eccentrically at an end face, that is axial with respect to the axis, of the filter element and with which a discharge opening of the discharge channel in the installed state of the filter element is closed,
wherein the at least one discharge closure element and the discharge opening are limited in their circumferential expansion with respect to the axis, respectively.

Also, the invention concerns a filter housing of a filter for liquid in which at least one filter element is arranged or can be arranged exchangeably, wherein the filter housing has
  at least one inlet for liquid to be purified,
  at least one outlet for purified liquid,
  at least one discharge channel for liquid for emptying the filter upon removal of the at least one filter element,
  at least one closable installation opening for installing and removing the at least one filter element.

The invention has the object to design a filter element, a filter, and a filter housing of the aforementioned kind in which a closure and release of the discharge opening can be realized more simply and reliably.

This object is solved according to the invention for the filter element in that the at least one discharge closure element at its free end face, that is axial with respect to the axis, comprises at least one closure surface that is at least partially axially oriented with respect to the axis, which can rest so as to seal axially with respect to the axis at a corresponding housing-associated sealing section which surrounds the housing-associated discharge opening.

According to the invention, the at least one discharge closure element is thus configured such that it seal-tightly closes the discharge opening in axial direction. The at least one discharge closure element covers in the closed state the housing-associated discharge opening, wherein the at least one closure surface seals acting axially with respect to the housing-associated sealing section. In this way, it is not required to introduce the at least one discharge closure element into the discharge opening, as is the case for the filter insert of the prior art. The at least one discharge closure element can be located in the closed state completely outside of the discharge opening and of the corresponding discharge channel. In this way, the filter element can be arranged with a greater tolerance in the filter housing.

Advantageously, the at least one closure surface with respect to a virtual axis of the discharge opening can be continuous in circumferential direction. In this way, a corresponding circumferentially continuous sealing action can be realized.

The at least one discharge closure element is arranged at an end face of the at least one filter element. In this way, the filter element can be inserted into the filter housing in axial direction with respect to the axis with the at least one discharge closure element leading so that the at least one discharge closure element automatically closes with axial sealing action the discharge opening.

Advantageously, the discharge opening can be arranged in a bottom region of the filter housing that is axial with respect to the axis. In this way, the at least one discharge closure element can be automatically connected to the discharge opening upon introduction of the filter element.

The at least one discharge closure element is arranged eccentrically with respect to the axis. In this way, a central region of the filter element can be used for other components, in particular an inlet or an outlet for the liquid.

The at least one discharge closure element is limited in its circumferential expansion circumferential with respect to the axis. This means that the at least one discharge closure element extends only across a preferably small section in circumferential direction circumferential with respect to the axis. In this way, it can be realized in a space-saving way. The at least one discharge closure element can thus be realized as a singular discharge closure element. The at least one discharge closure element must be just about so large that it can close off the discharge opening. In this way, material can be saved.

Advantageously, the filter element can be embodied as a so-called hollow filter element. A hollow filter element is characterized in that it comprises at least one element interior which is surrounded by the filter medium, in particular a filter bellows with filter medium. The filter medium can be flowed through by the liquid to be purified from the exterior to the interior to the element interior, or in reverse direction. The element interior comprises a liquid passage to the exterior through which, depending on the flow direction, the purified liquid can exit the element interior or liquid to be purified can flow into it. The filter medium can circumferentially surround the element interior with respect to an axis, in particular an element axis. At least one end face that is axial with respect to the axis, the filter medium can be connected with an end body, in particular an end disc. At least one end body can comprise at least one through opening for the element interior.

The hollow filter element can be advantageously a so-called round filter element with a round cross section, an oval round filter element with an oval cross section, a flat-oval round filter element with a flattened oval cross section, a conical round filter element in which the round cross section tapers in axial direction toward a main axis, a conical oval round filter element in which the oval cross section in axial direction tapers at least in the direction of a transverse axis, a conical flat-oval round filter element in which the flat-oval cross section in axial direction tapers at least in the direction of a transverse axis, or a hollow filter element with a different type, in particular a square, cross section and/or a different type of axial cross-sectional course in the direction of an axis.

The filter medium can advantageously be circumferentially closed or open with respect to the axis. The filter medium can be in particular folded or curved in a star shape, preferably zigzag-shaped or corrugated. The filter medium can also not be folded or not be curved.

The filter element can advantageously be part of a motor oil filter of an internal combustion engine of a motor vehicle. The motor oil filter can advantageously be part of a motor oil circuit of an internal combustion engine. It can serve for purifying motor oil which is supplied to the internal combustion engine. The invention is however not limited to a motor oil filter of a motor oil circuit of an internal combustion engine of a motor vehicle. Instead, it can also be used for different types of liquid systems, in particular fuel systems, hydraulic systems, cooling systems, or fluid systems with urea-water solution, of motor vehicles or other machines. The liquid filter can also be used outside of automotive technology, in particular in industrial motors.

The invention can be used in motor vehicles, in particular passenger cars, trucks, buses, agricultural and/or construction vehicles, construction/agricultural machines, compressors, industrial motors or other devices in particular with internal combustion engines. The invention can be used for land vehicles, water vehicles, and/or aircraft.

In an advantageous embodiment, the at least one discharge closure element can be configured at least in sections thereof in a bell shape, cup shape, bowl shape, plumber's plunger shape or the like so that a side of the discharge closure element which is facing away from the end disc of the filter element has a larger circumference than a side which is facing the of the end disc. In this way, the at least one discharge closure element can be arranged above the discharge opening and close it off. The circumferential wall of the at least one discharge closure element can surround in this context the discharge opening so as to cover it. The closure surface can be realized at the free rim of the circumferential wall.

In a further advantageous embodiment, the at least one discharge closure element can be elastic at least in sections thereof. In this way, an axial position tolerance, in particular of the filter element in the filter housing, can be compensated. Moreover, in particular operation-caused vibrations can be compensated better. A bell-shaped or cup-shaped or similarly shaped discharge closure element can be arranged upon installation of the filter element in the filter housing above the discharge opening and, by a corresponding axial compression with respect to the axis with its rims against the housing-associated sealing section, can develop a greater sealing effect.

In a further advantageous embodiment, the at least one discharge closure element can be fastened by means of a holding device at an end body of the filter element that is arranged with respect to the axis at an end face. In this way, the at least one discharge closure element can be installed and removed together with the filter element. Furthermore, the holding device with respect to the holding function and the at least one discharge closure element with respect to its closing and sealing function can be optimized, respectively.

The end face end body can be advantageously a so-called end disc. An end face of the filter medium can be closed off by the end face end disc.

Advantageously, the at least one discharge closure element can be connected separably or non-separably with the end face end body by means of the holding device. The filter element can be retrofitted by means of a separable holding device with the at least one discharge closure element.

Alternatively, the holding device can be connected to the end body so as to be separable only by being destroyed. In this way, a correspondingly more stable mechanical connection can be realized.

Advantageously, the at least one discharge closure element and the holding device can be realized of different materials.

Alternatively, the holding device and the at least one discharge closure element can be realized together as one piece or of a multi-part configuration or as a multi-component part.

In a further advantageous embodiment, the holding device can be fastened by means of a quick-connect connection to the end body. In this way, the connection between the holding device and the end body can be produced simply and quickly.

Advantageously, the holding device can be fastened to the end body by means of a clamping connection, a locking connection, a clip connection, a rotary and/or insertion connection, in particular a screw connection and/or a bayonet-type connection, or the like, or a combination of several connection types.

In a further advantageous embodiment, at least one discharge closure element can be connected to the holding device so as to be separable or so as to be separable only by being destroyed.

Advantageously, at least one discharge closure element can be buttoned into the holding device. By buttoning, a simple, in particular separable, connection can be realized. For a connection of the discharge closure element in the holding device by buttoning, no further components are required. The discharge closure element, preferably made of an elastic material, can be introduced into a cutout in the holding device and can be secured by friction or form fit in the holding device by expansion of the elastic material after introduction into the cutout. The cutout can be an opening which is closed at one side, for example, in the form of a blind bore, or an opening which penetrates the holding device, for example, in the form of a through bore. In case of a penetrating opening, the discharge closure element can be pulled from the side facing away from the discharge closure into the cutout or can be pushed into the cutout from the side which is facing the discharge closure element.

The at least one discharge closure element can also be connected in a different way to the holding device, in particular by means of a clamping connection, a locking connection, a clip connection, a rotary and/or insertion connection, in particular a screw connection and/or a bayonet-type connection, or the like, or a combination of several connection types.

In a further advantageous embodiment, the filter element can comprise at least one part of at least one positioning device with which a rotational orientation of the filter element with respect to the axis in the filter housing can be unequivocally predetermined. By means of the at least one positioning device, the filter element upon installation with respect to the rotational orientation can be oriented such that the at least one discharge closure element is positioned automatically correctly at the discharge opening. In this way, an installation of the filter element and the automatic closure of the discharge opening by means of the at least one discharge closure element can be realized more simply and reliably.

The at least one positioning device can be designed such that, in case of a wrong installation of the filter element or the use of a wrong filter element, closing of the filter housing and/or an operation of the filter can be prevented. In this way, the functional safety of the filter can be improved.

Advantageously, the at least one positioning device can be realized spatially separate from the discharge opening and/or the at least one discharge closure element. In this way, the corresponding components can be realized more flexibly, in particular at different locations.

In a further advantageous embodiment, the at least one positioning device can comprise at least one element-associated positioning element and at least one corresponding housing-associated positioning element. The at least one element-associated positioning element and the at least one housing-associated positioning element can interact in this way with each other in order to ensure the corresponding rotational orientation of the filter element in the filter housing.

In a further advantageous embodiment, at least one positioning element can comprise at least one depression and at least one corresponding positioning element can comprise a raised portion which can engage the depression.

Advantageously, the at least one positioning device can be configured such that a correct installation of the filter element in the filter housing is possible only in the correct rotational orientation. Otherwise, the filter can be configured such that in particular a closure of the filter element can be prevented. In this way, installation errors can be recognized early on.

Advantageously, at least one positioning element can comprise a pin or a projection. Such raised portions can interact with corresponding depressions, in particular holes or cutouts in the respective other component.

Advantageously, at least one positioning element, with respect to the axis, can be arranged axially at the end face, radially outwardly, and/or radially inwardly at the at least one filter element. In case of an axial end face arrangement, a radial expansion of the filter element can be reduced correspondingly. Correspondingly, in case of a radially outwardly or radially inwardly arranged positioning element an axial expansion of the filter element can be reduced correspondingly. A positioning element can also extend in radial direction from the interior across the end face to the exterior. It can also be located only radially inwardly and at the end face or radially outwardly and at the end face.

Advantageously, the at least one positioning device is located at the side that is radially opposite the discharge channel or the discharge closure element with respect to the housing axis of the filter housing or the installation/removal axis of the filter element into or out of the filter housing and an element axis of the filter element.

In an alternative embodiment, the positioning device, in deviation from an arrangement positioned radially opposite to the discharge channel or the discharge closure element, is arranged at an angle about the housing axis of the filter housing or the installation/removal axis of the filter element into or out of the filter housing and an element axis of the filter element.

Alternatively or additionally, at least one positioning device can be predetermined by the outer shape of the filter element and a corresponding inner shape of a receptacle of the filter housing for the filter element. In this way, in particular a filter element that is asymmetric with respect to the axis, in particular is non-round, can be arranged in a correspondingly shaped filter housing. In this way, a separate positioning element is not necessary.

The object is solved furthermore for the filter according to the invention in that the at least one discharge closure element at its free end face, that is axial with respect to the axis, comprises at least one closure surface which is at least partially axially oriented with respect to the axis and which is resting so as to seal axially at a corresponding housing-associated sealing section surrounding the housing-associated discharge opening.

In an advantageous embodiment, the filter housing can comprise at least one part of at least one positioning device with which a rotational orientation of the at least one filter element in the filter housing with respect to the axis is unequivocally predefined. In this way, the filter element upon installation in the filter housing can be automatically oriented such that the at least one discharge closure element is positioned automatically above the discharge opening.

Furthermore, the object for the filter housing is solved according to the invention in that the filter housing comprises at least one part of at least one positioning device with which a rotational orientation of the at least one filter element in the filter housing with respect to a virtual axis is unequivocally predefined wherein the at least one housing-associated part of the at least one positioning device is arranged spatially separate from the at least one discharge channel.

In other respects, the features and advantages which have been discussed in connection with the filter element according to the invention, the filter according to the invention, and the filter housing according to the invention and their respective advantageous embodiments apply likewise among each other, and vice versa. The individual features and advantages can of course also be combined with each other, wherein further advantageous effects may result which go beyond the sum of the individual effects.

BRIEF DESCRIPTION OF THE DRAWINGS

Further advantages, features, and details of the invention result from the following description in which embodiments of the invention will be explained in more detail with the aid of the drawing. A person of skill in the art will also consider the features disclosed in the drawing, the description, and the claims in combination expediently individually and combine them to expedient further combinations.

In the Figures, same components are provided with same reference characters.

DESCRIPTION OF PREFERRED EMBODIMENTS

Figure 1:
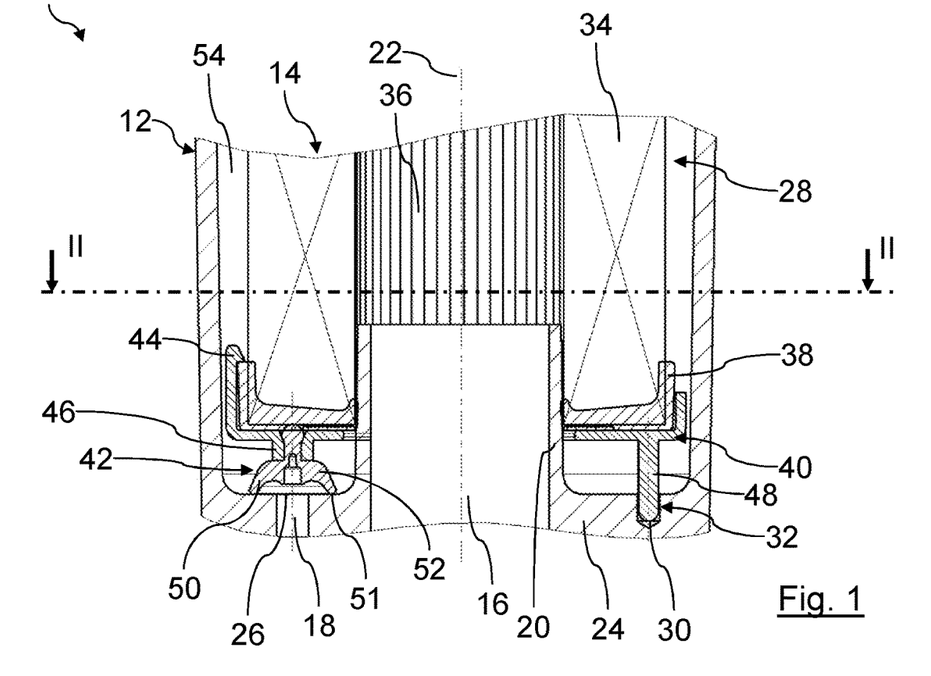
FIG. 1 shows schematically a longitudinal section of a detail of a filter for liquid according to a first embodiment, with a filter housing in which a filter element is exchangeably arranged.
Figure 2:
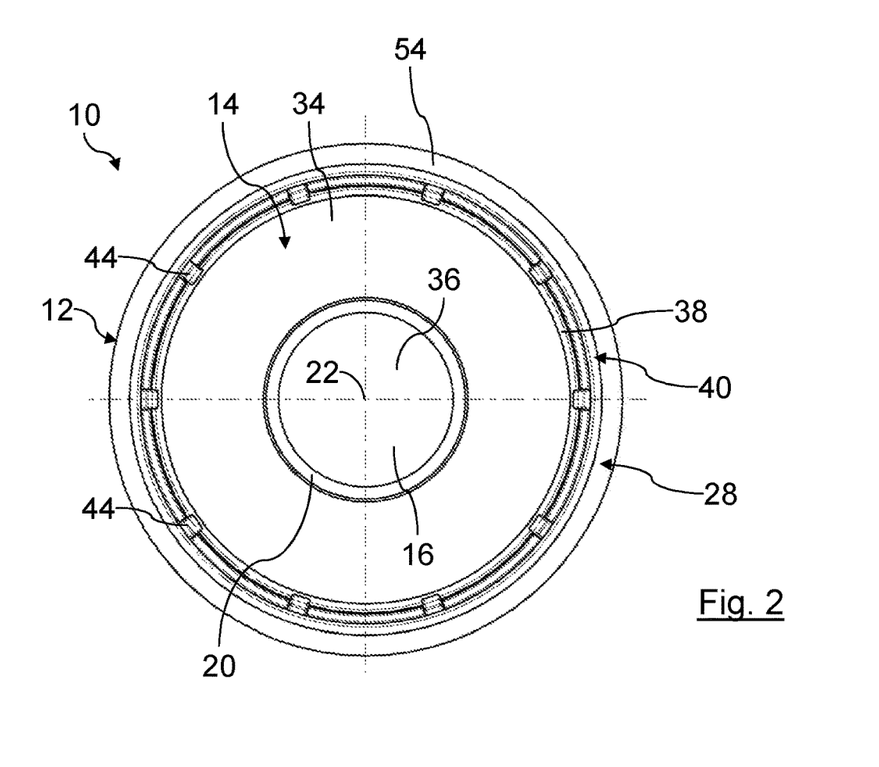
FIG. 2 shows schematically a cross section of the filter of FIG. 1 along the section line II-II indicated in FIG. 1.

In FIGS. 1 and 2, a filter 10 for purifying liquid, for example, motor oil, according to a first embodiment is shown. The filter 10 can be, for example, arranged in a motor oil circuit of an internal combustion engine of a motor vehicle for purifying the motor oil.

The filter 10 comprises an openable filter housing 12 in which a filter element 14 is exchangeably arranged.

The filter housing 12 comprises an inlet, not illustrated in the Figures, for the liquid to be purified, an outlet 16 for purified liquid, a discharge channel 18 for emptying the filter 10 upon removal of the filter element 14, and an installation opening, not illustrated in the Figures, for installation and removal of the filter element 14 in a receptacle 28 for the filter element 14 in the interior of the filter housing 12. The installation opening is closable with a non-illustrated housing cover which, for example, can be open for exchange of the filter element 14.

The outlet 16 is realized in a cylinder section 20. The cylinder section 20 extends from a bottom section 24 of the filter housing 12 coaxially to a virtual axis 22 in the receptacle 28. The cylinder section 20 is connected as one piece with the bottom section 24. The bottom section 24 is positioned at the side which is axially oppositely located with respect to the installation opening and the housing cover.

The axis 22 coincides in the embodiment with a housing axis of the filter housing 12, an installation/removal axis of the filter element 14 into or out of the filter housing 12, and an element axis of the filter element 14. For improved clarity, in the following the element axis, the housing axis, and the installation/removal axis are provided with the same reference character 22 and are referred to for short as axis 22. It is understood that when the filter element 14 is removed, depending on the context, the housing axis, the element axis and/or the installation/removal axis is intended. When in the following "radial", "coaxial", "axial", "tangential", "circumferential", "concentric", "eccentric" or the like is referred to, this relates to the axis 22, if nothing else is mentioned.

The discharge channel 18 is arranged with respect to the axis 22 eccentrically in the bottom section 24. For example, a virtual axis of the discharge channel 18 extends parallel to the axis 22. The discharge channel 18 opens with a discharge opening 26 into the receptacle 28. Alternatively, the axis of the discharge channel 18 can also extend at a slant to the axis 22.

Moreover, in the bottom section 24 a housing-associated positioning element 30 in the form of a blind bore is arranged. The housing-associated positioning element 30 is part of a positioning device which is identified as a whole by 32, with which a rotational orientation of the filter element 14 in the receptacle 28 of the filter housing 12 with respect to the axis 22 can be unequivocally predefined. The housing-associated positioning element 30 is realized spatially separate from the discharge channel 18 and from the discharge opening 26. For example, the housing-associated positioning element 30 is located at the side of the axis 22 radially opposite relative to the discharge channel 18. A virtual axis of the blind bore of the positioning element 30 extends with its axis parallel to the axis 22.

The filter element 14 is embodied in an exemplary fashion as a so-called round filter element. The filter element 14 comprises a filter medium 34 which, for example, is folded in a zigzag shape and circumferentially closed. The filter medium 34 continuously surrounds circumferentially an element interior 36 of the filter element 14. At its axial end faces, the filter element 34 is connected respectively with a so-called end disc of which in FIG. 1 only the end disk 38 at the outlet side is shown which is facing the bottom section 24. The outlet side-associated end disc 38 comprises a central coaxial opening through which the housing-associated cylinder section 20 is passed.

At the outlet side-associated end disc 38, a discharge closure element 42 is attached by a ring-shaped holding device 40. The discharge closure element 42 serves for closing the discharge opening 26 when the filter element 14 is correctly installed.

The holding device 40 in an exemplary fashion is connected by means of a clip connection with the outlet side-associated end disk 38. For this purpose, the holding device 40 comprises a plurality of locking hooks 44 distributed in circumferential direction at the radially outer circumferential side. The locking hooks 44 engage respectively a radially outer coaxial cylindrical circumferential wall of the end disc 38 from the exterior and lock at the side which is axially facing away from the bottom section 24 behind the circumferential wall of the end disc 38.

At its side which is axially facing away from the outlet side-associated end disc 38, the holding device 40 comprises a receptacle 46 into which the discharge closure element 42 is buttoned.

At the side which is radially oppositely positioned with respect to the axis 22, an element-associated positioning element 48 in the form of a pin is arranged at the side of the holding device 40 which is axially facing away from the outlet side-associated end disc 38. The element-associated positioning element 48 is thus realized spatially separate from the drainage closure element 42. A virtual axis of the element-associated positioning element 48 extends parallel to the axis 22. The element-associated positioning element 48 is arranged with respect to the discharge closure element 42 in the same way as the housing-associated positioning element 30 with respect to the discharge opening 26. In the correct rotational orientation of the filter element 14 in which the element-associated positioning element 48 engages the housing-associated positioning element 30, the discharge closure element 42 closes off the discharge opening 26. In other incorrect rotational orientations, the element-associated positioning element 48 prevents that the filter element 14 can be installed completely in the filter housing 12 so that the housing cover cannot be closed.

The discharge closure element 42 comprises a closure section 50 with the shape similar to a bell. The free rim of the closure section 50 is facing away from the filter element 14 and facing the discharge opening 26. The free rim of the closure section 50 forms an axially oriented closure surface 51. The closure surface 51 is continuous in circumferential direction with respect to a virtual axis of the discharge closure element 42. The closure element 50 is made of an elastic material so that by corresponding axial pressure of the filter element 14 in the direction toward the bottom section 24 it can elastically deform and thus can improve a sealing effect. When the filter element 14 is correctly installed, the closure surface 51 is resting so as to seal axially the corresponding sealing section 52 of the bottom section 24. The sealing section 52 continuously surrounds circumferentially the discharge opening 26 with respect to its axis.

In operation of the filter 10, the liquid to be purified is introduced through the inlet into the filter housing 12 and passes into an annular inlet chamber 54 which radially surrounds the filter element 14. The liquid to be purified flows from the exterior to the interior in the radial direction through the filter medium 34 into the element interior 36. By means of the filter element 34 the liquid is purified. The purified liquid passes from the element interior 36 into the outlet 16 and exits in this way the filter housing 12.

For exchange of the filter element 14, the housing cover which is not illustrated in the Figures is opened. The filter element 14 is pulled out in axial direction from the receptacle 28. The discharge opening 26 is opened by the discharge closure element 42 so that the liquid contained in the filter housing 12 can drain through the discharge channel 18 and the filter housing 12 is thus emptied.

For installation of a new filter element 14, the latter is inserted with the holding device 40 leading in axial direction into the receptacle 28. As needed, the filter element 14 must be rotated about the axis 22 relative to the filter housing 12 such that the element-associated positioning element 42 can glide into the housing-associated positioning element 30. In this rotational orientation, the discharge closure element 42 is positioned above the discharge opening 26. By a corresponding axial force on the filter element 14, for example, when closing the housing cover, the closure surface 51 of the discharge closure element 42 is pushed in axial direction seal-tightly against the housing-associated sealing section 52 and, in this way, the discharge opening 26 is seal-tightly closed. The filter 10 is operational after completely closing the housing cover.

Figure 3:
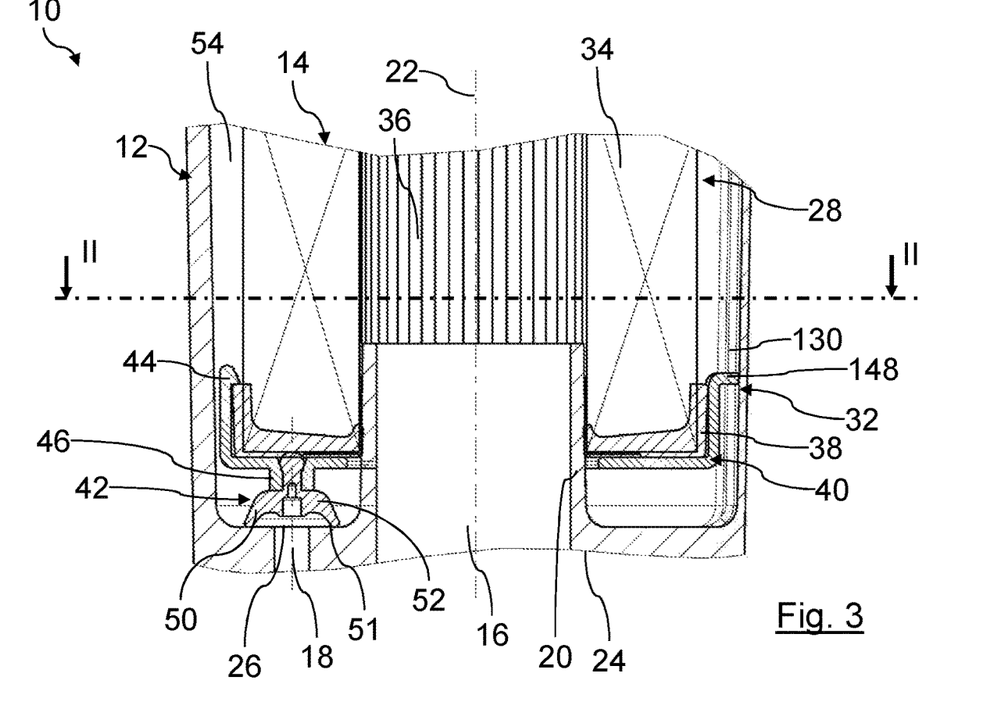
FIG. 3 shows schematically a longitudinal section of a detail of a filter for liquid according to a second embodiment.
Figure 4:
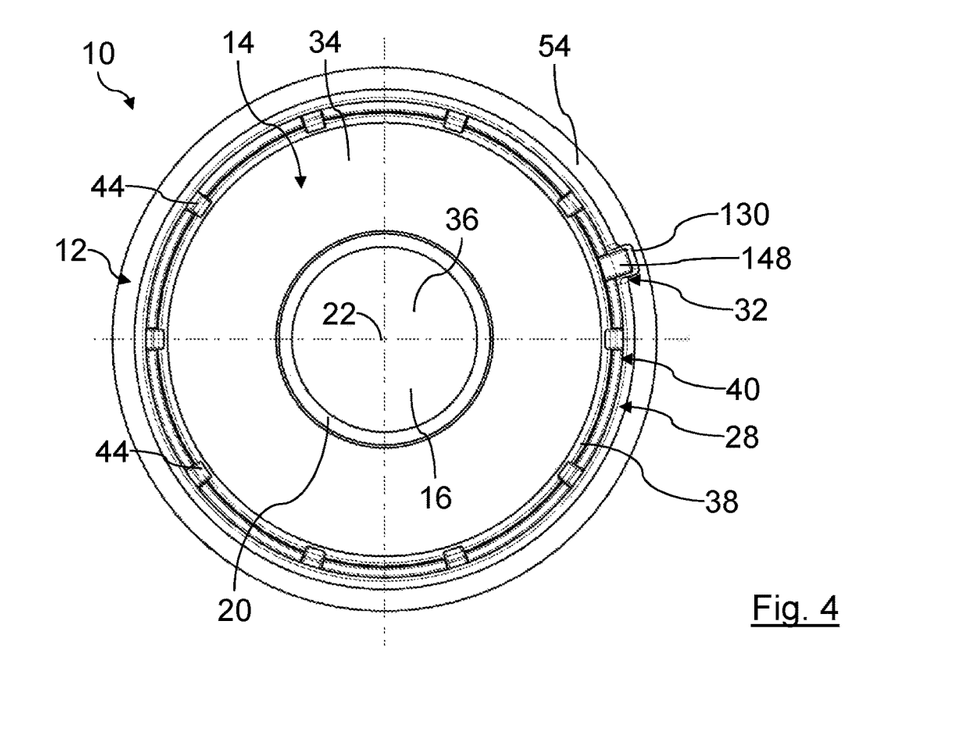
FIG. 4 shows schematically a cross section of the filter of FIG. 3 along the section line IV-IV shown in FIG. 3.

In FIGS. 3 and 4, a filter 10 according to a second embodiment is illustrated. Those elements that are similar to those of the first embodiment of FIGS. 1 and 2 are provided with the same reference characters. In contrast to the filter 10 according to the first embodiment of FIGS. 1 and 2, in the second embodiment a housing-associated positioning element 130, as shown, for example, in FIG. 4, is realized as a radial depression in the radial inner circumferential side of a circumferential wall of the filter housing 12. A corresponding element-associated positioning element 148 is realized as a corresponding projection at the radially outer circumferential side of the holding device 40 which extends radially in outward direction. As in the first embodiment, the positioning elements 130, 148 are positioned at the side that is radially opposite to the discharge closure element 42 and to the discharge opening 26 with respect to the axis 22 and spatially separate from them.

Figure 5:
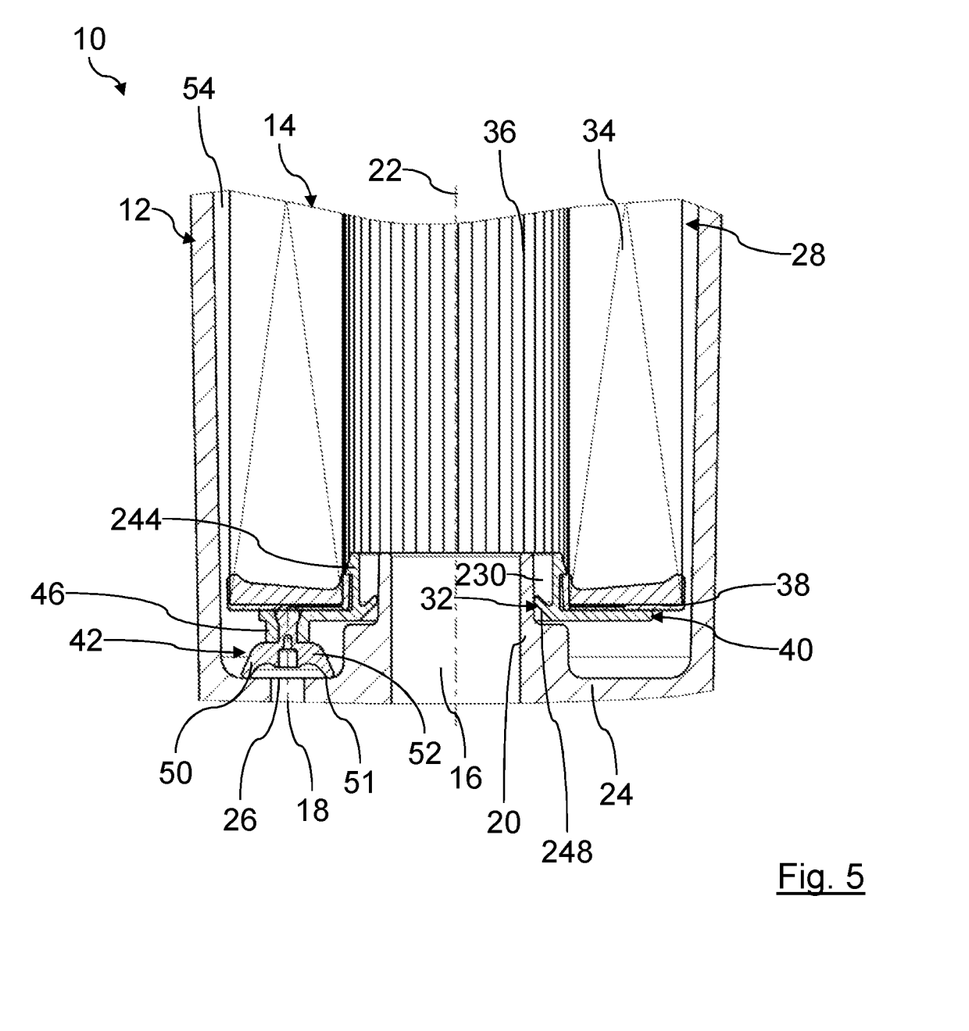
FIG. 5 shows schematically a longitudinal section of a detail of a filter for liquid according to a third embodiment.

In FIG. 5, a filter 10 according to a third embodiment is illustrated. Those elements that are similar to those of the second embodiment of FIGS. 3 and 4 are provided with the same reference characters. In contrast to the filter 10 according to the second embodiment of FIGS. 3 and 4, in the third embodiment two housing-associated positioning elements 230 in the form of radial depressions are arranged in the radially outer circumferential wall of the cylinder section 20. Corresponding element-associated positioning elements 248 are realized as corresponding radial projections at the radially inner circumferential side of the holding device 40.

Also, instead of the locking hooks 44 at the radially outer circumferential side as in the first and the second embodiment, corresponding locking hooks 244 are arranged at the radially inner circumferential side of the holding device 40. These locking hooks 244 lock behind a corresponding radially inner cylindrical coaxial circumferential wall of the end disc 38.

What is claimed is:

1. A filter element of a filter for a liquid, the filter element configured to be arranged exchangeably in a filter housing of the filter, the filter element comprising:
　at least one filter medium surrounding circumferentially a virtual axis of the filter element;
　an end body formed as an end disc arranged on axial end of the at least one filter medium, the end disc having a central coaxial opening;
　a holding device fastened to the end disc and arranged on an axial outer face of the end disc, the holding device comprising:
　　a first positioning element, formed as a first radial projection projecting radially inwardly from the holding device into the central coaxial opening of the end disc;
　　a second positioning element, formed as a second radial projection projecting radially inwardly from the holding device into the central coaxial opening of the end disc, the second positioning element spaced circumferentially away from the first positioning element about a circumference of the central coaxial opening;
　　at least one discharge closure element provided on the holding device and arranged eccentrically to the virtual axis, the at least one discharge closure element projecting axially outward away from the end disc, wherein the at least one discharge closure element includes a closure surface configured to close off a discharge opening of a discharge channel of the filter housing in an installed state of the filter element in the filter housing;
　　wherein the positioning elements are configured to engage into complimentary aligned radial depressions in the filter housing formed by a positioning device of the filter housing to unequivocally predefine a rotational orientation of the filter element within the filter housing with respect to the virtual axis;

wherein the at least one discharge closure element is fastened with the holding device to the end body of the filter element.

2. The filter element according to claim 1, wherein the at least one discharge closure element is bell-shape or cup-shaped at least in sections thereof.

3. The filter element according to claim 1, wherein the at least one discharge closure element is elastic at least in sections thereof.

4. The filter element according to claim 1, wherein the at least one discharge closure element is fastened with the holding device to the end body of the filter element, wherein the end body is arranged at an end face with respect to the virtual axis.

5. The filter element according to claim 4, wherein the holding device is fastened by a quick connect connection to the end body.

6. The filter element according to claim 4, wherein the at least one discharge closure element is connected to the holding device so as to be separable from the holding device.

7. The filter element according to claim 4, wherein the at least one discharge closure element is connected to the holding device so as to be separable only by being destroyed.

8. A filter comprising:
a filter housing; and
a filter element according to claim 1 exchangeably arranged in the filter housing;
wherein the filter housing comprises:
 at least one inlet for a liquid to be purified;
 at least one outlet for purified liquid;
 at least one discharge channel configured to empty the liquid from the filter when the at least one filter element is removed from the filter housing; and
 at least one closable installation opening for installation and removal of the at least one filter element;
wherein the filter housing further comprises:
 a housing bottom wall in which the discharge opening is arranged, the housing bottom wall further comprising:
  a cylindrical section formed on the housing bottom wall and project axially inwardly into the central coaxial opening of the filter element; and
  a plurality of axially extending depressions formed into a radially outer surface of the cylindrical section, the plurality of axially extending depressions spaced circumferentially apart to align with, receive and engage respective ones of the positioning elements of the filter element to unequivocally enforce the predefined rotational orientation of the filter element within the filter housing with respect to the virtual axis when the filter element is installed in the filter housing;
wherein the closure surface is arranged on an axial end face of the at least one discharge closure element;
wherein the closure surface of the at least one discharge closure element rotationally aligned to the predefined rotational orientation of the filter element within the filter housing due to the engagement of the positioning elements of the filter element into the axially extending depressions of the cylindrical section of the filter housing, such that the closure surface rests so as to seal axially with respect to the virtual axis against a sealing section of the bottom wall of the filter housing that surrounds the discharge opening.

* * * * *